(12) United States Patent
Migdal

(10) Patent No.: US 12,249,143 B2
(45) Date of Patent: Mar. 11, 2025

(54) KEYFRAME SELECTION FOR COMPUTER VISION ANALYSIS

(71) Applicant: NCR Voyix Corporation, Atlanta, GA (US)

(72) Inventor: Joshua Migdal, Wayland, MA (US)

(73) Assignee: NCR Voyix Corporation, Atlanta, GA (US)

( * ) Notice: Subject to any disclaimer, the term of this patent is extended or adjusted under 35 U.S.C. 154(b) by 124 days.

(21) Appl. No.: 16/943,149

(22) Filed: Jul. 30, 2020

(65) Prior Publication Data
US 2022/0036084 A1    Feb. 3, 2022

(51) Int. Cl.
G06V 20/40    (2022.01)
G06T 3/60    (2006.01)
G06T 7/20    (2017.01)
G06V 10/25    (2022.01)

(52) U.S. Cl.
CPC ............... *G06V 20/41* (2022.01); *G06T 3/60* (2013.01); *G06T 7/20* (2013.01); *G06V 10/25* (2022.01); *G06T 2207/10016* (2013.01)

(58) Field of Classification Search
None
See application file for complete search history.

(56) References Cited

U.S. PATENT DOCUMENTS

| 6,549,643 | B1 | 4/2003 | Toklu et al. |
| 7,184,100 | B1 | 2/2007 | Wilf et al. |
| 10,997,423 | B1 * | 5/2021 | Borras ................ G06V 20/56 |

| 2003/0210886 | A1 | 11/2003 | Li et al. |
| 2006/0257048 | A1 * | 11/2006 | Lin ........................ G06V 20/40 382/276 |
| 2019/0258870 | A1 * | 8/2019 | Kundu ............... G06Q 20/4016 |
| 2021/0264664 | A1 * | 8/2021 | Saracchini ....... H04N 5/232939 |

FOREIGN PATENT DOCUMENTS

WO    WO-2014154533 A1    10/2014

OTHER PUBLICATIONS 20-2015—EP Search Report dated Sep. 27, 2021.
Zhang Hao et al. "Recognizing Human Activities by Key Frame in Video Sequences" Journal of software, vol. 5, No. 8, Aug. 27, 2010 (Aug. 27, 2010), pp. 818-825 Retrieved from the Internet: http://www.jsoftware.us/vol5/jsw0508-3.pdf [retrieved by EPO on Sep. 15, 2021].
Ba Tu Truong et al. "Video abstraction: a Systematic Review and Classification" ACM Transactions on Multimedia Computing Communications and Applications, Association for Computing Machinery, US, vol. 3, No. 1, Feb. 1, 2007 (Feb. 1, 2007), pp. 1-37.
"European Application Serial No. 21164424, Communication pursuant to Article 94(3) EPC mailed Jan. 17, 2055", 6 pgs.

* cited by examiner

*Primary Examiner* — Vikkram Bali
(74) *Attorney, Agent, or Firm* — Schwegman Lundberg & Woessner, P.A.

(57) ABSTRACT

Upon a triggering event, frames of a video feed are analyzed for activity or motion. One frame or a subset of the frames are selected as a keyframe/keyframes based on one or measures associated with one or more metrics derived from the frames. The keyframe/keyframes optimally reflects an activity or degree of motion across the frames. The keyframe/keyframes are then provided as input to a computer vision or machine learning application to improve the efficiency, accuracy, and/or precision of results produced by or decisions made by the application.

20 Claims, 8 Drawing Sheets

KEYFRAME SELECTION FOR COMPUTER VISION ANALYSIS

BACKGROUND

Keyframes play an important role in computer vision and machine learning applications. Keyframe selection is a way of reducing the amount of computer vision processes that are needed to run at key times, rather than running against every frame of a video sequence, which is computationally expensive to identify or detect what is desired from the frames of the video sequence. Keyframes are also used to maximize accuracy and minimize errors by ensuring complex machine learning classification and computer vision algorithms are not run unnecessarily on spurious, redundant, or unimportant parts of a video feed.

Additionally, keyframes are often used in video encoding algorithms to create simple checkpoints that can reset the state of an encoder. Keyframes selected and used in this way are typically chosen after a certain, small, amount of time. For instance, the "keyframe interval" might be 1 keyframe every 30 frames. Keyframes may also be selected in video encoding once a certain number of errors or inter-frame differences have accumulated and the encoder determines a "reset event" is required.

Another use of keyframe in video analysis is for cutscene detection. Cutscene detection is the process of analyzing a video and detecting when a video editing "cut" has been made. This is usually indicated by a sudden change in the content of the video and can be detected by frame differencing or optical flow analysis.

Since processing and classification of images are of vital importance in computer vision technologies and machine learning technologies, choosing the right images to operate on is a fundamental concern to these industries.

SUMMARY

In various embodiments, methods and a system for keyframe selection and determination are presented.

According to an embodiment, a method for keyframe selection and determination is presented. For example, a trigger event is determined and based on the trigger event frames of a video feed are obtained. A termination event is identified from a subset of the frames. At least one keyframe that represents an optimal representation of an activity or a motion within the subset of frames is selected/determined based on a calculated measure. The at least one keyframe is provided as the optimal representation of the activity or the motion for the subset of the frames.

DETAILED DESCRIPTION

Figure 1A:
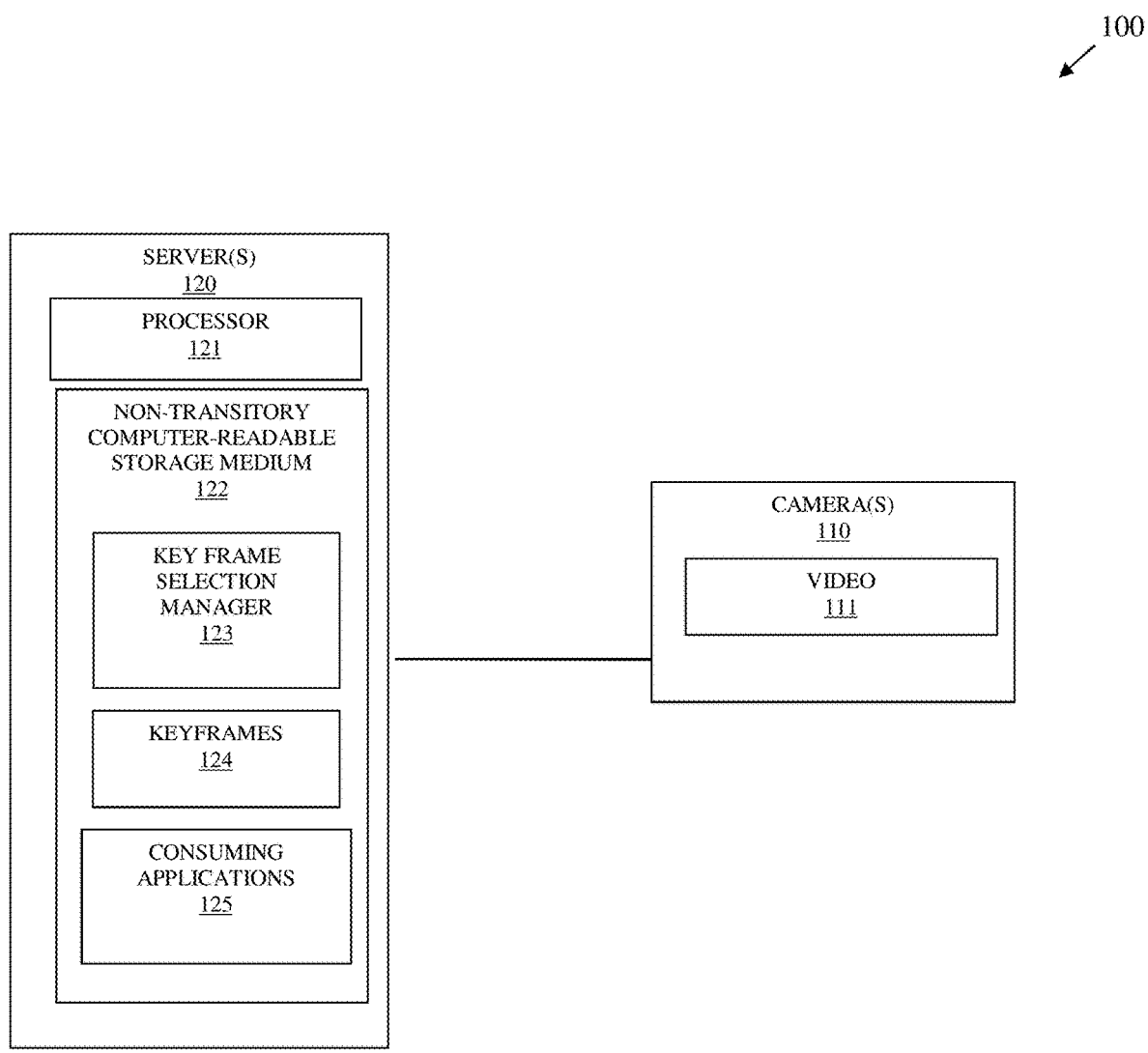
FIG. 1A is a diagram of a system for keyframe selection and determination, according to an example embodiment.

FIG. 1A is a diagram of a system 100 for keyframe selection and determination, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of keyframe selection and determination, presented herein and below.

System 100 includes one or more cameras 110 and a server 120.

The camera(s) 110 captures video 111 of a designated area (such as, and by way of example only, a transaction area of a transaction terminal during a transaction); the video 111 is streamed in real time to server 120 or any other network location or network file accessible from server 120.

Server 120 comprises a processor 121 and a non-transitory computer-readable storage medium 122. Medium 122 comprises executable instructions for a keyframe selection manager 123 and, optionally, consuming applications 125. Medium 122 also comprises keyframes 124 or references to keyframes 124 produced by keyframe selection manager 124 and provided as input to consuming applications 125.

As will be illustrated more completely herein and below, system 100 permits advanced methods for the measurement, identification, and selection of keyframes from videos 111 or sequences of images for computer vision and machine learning applications (e.g., consuming applications 125). Several techniques are described for choosing the correct time or set of times to begin a search for a keyframe. Serval techniques are also described herein for assessing key performance measures that are used to select a single or small set of key frames from within that subset.

Furthermore, system 100 uses computer vision to identify "trigger points" within a video 111 to begin and end the search for keyframes 124. Once these trigger points are identified other, additional, computer vision techniques are applied to the subset to find a keyframe 124 or a small subset of keyframes 124 that can be used to represent that period of activity as indicated in the full video 111. These keyframes 124 can be used in further consuming applications 125, including computer vision applications, independently, or as a summary representation of the period of activity itself.

Keyframe selection manager 123 is configured to identify a region of interest for each of the plurality of frames provided with video 111. The region of interest can be the entire field of view from the camera 110, or it can be defined as a portion or number of portions within the field of view for the camera 110. Moreover, the region of interest is monitored by the keyframe selection manager 123 for activity of some kind.

In an embodiment and a continuing example described herein, a simple motion metric is used as the measure of activity. This can be accomplished using standard frame differencing techniques. This is useful due to its ease of calculation and provides a reliable measure.

It is to be noted that other measures are also possible. By way of nonlimiting examples, such measures include facial recognition and detection, color, changes of color, texture, oriented histograms, optical flow, both directional and non-directional, silhouette/blob-based features, deep learning- and other-based regression, bounding box, classification, centroid, and binary classification features can all be used as the measure of activity into and out of the region of interest.

Unless otherwise stated, all processing discussed below with the FIGS. 1B-1F is performed by keyframe selection manager 123.

Figure 1B:
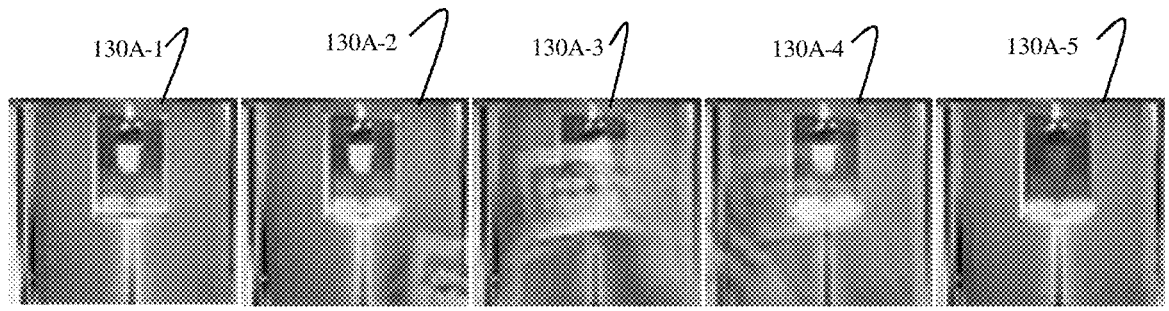
FIG. 1B is example frames of video captured that depict activity within some of the frames, according to an example embodiment.

FIG. 1B is example frames of video captured that depict activity within some of the frames, according to an example embodiment.

FIG. 1B shows an example of an activity as captured by system 100. The illustrated activity depicts frames associated with scanning an item over a barcode scanner during a transaction at a transaction terminal. The terminal can be a Point-Of-Sale (POS) terminal operated by a cashier during a customer checkout or the terminal can be a Self-Service Terminal (SST) operated by the customer during a self-checkout.

The activity starts with a period of no motion. It is defined by the beginning of such motion and continues until no motion is observed within the region of interest. The region of interest is an area above the barcode scanner where the item is held by the operator (cashier or customer) and passed or swiped over the barcode scanner for purposes of the transaction terminal identifying the item, obtaining item details and pricing, and updating an item list for the transaction.

5 frames of video 111 are illustrated in FIG. 1B, a starting frame showing no activity or motion 130A-1, a first detected motion frame or start of the activity frame, 130A-2, motion or activity directly over the barcode scanner frame 130A-3, motion or activity moving away from the barcode scanner frame 130A-4, and a last frame 130A-5 for which again there is no detected motion or activity.

Figure 1C:
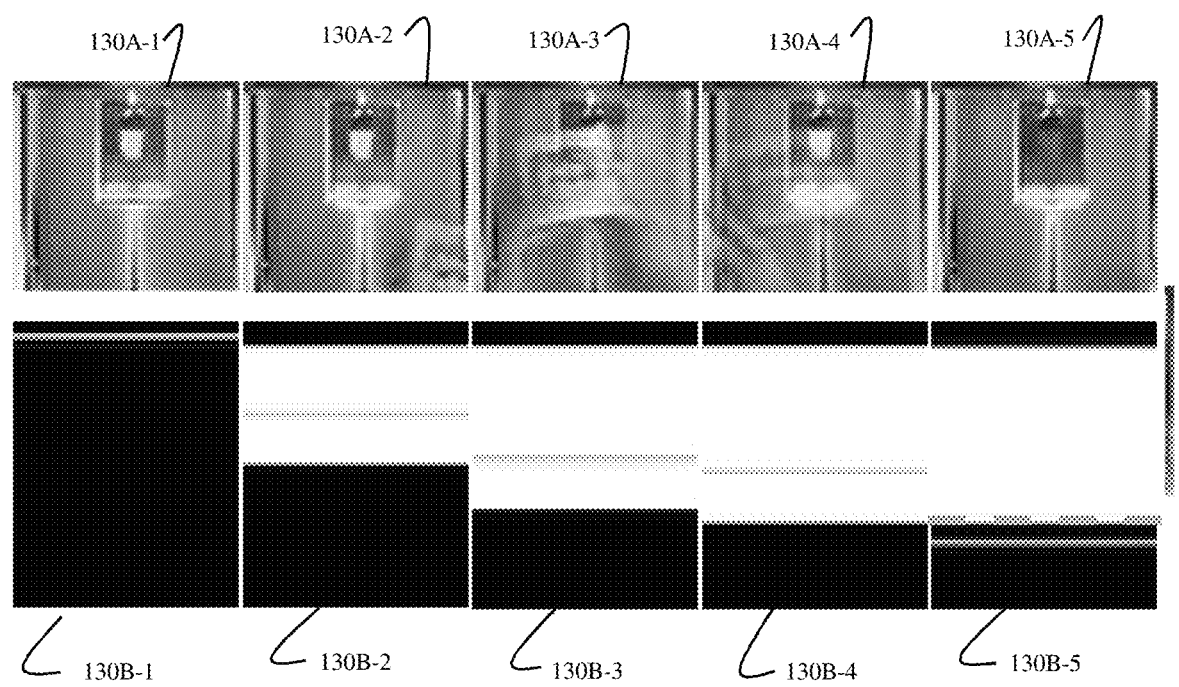
FIG. 1C is a diagram of sweeping activity reflecting an amount of activity detected within each of the example frames of video from FIG. 1B, according to an example embodiment.

FIG. 1C is a diagram of sweeping activity reflecting an amount of activity detected within each of the example frames of video from FIG. 1B, according to an example embodiment.

FIG. 1C shows the recording and tracking of such activity in an Electrocardiogram (EKG)-style rendering that recasts the frames 130A-1 to 130A-5 into 130B-1 to 130B-5 for purposes of modeling the activity or motion detected in frames 130A-1 to 130A-5.

Keyframe selection manager 123 performs image processing techniques to enhance the efficacy of tracking the measure (degree, amount, magnitude) of the detected activity. For instance, in the example shown in the FIGS. 1B-1F, a motion blur has been applied to an activity tracker to smooth out the signal associated with the activity or the motion being modeled in frames 130B-1 to 130B-5. Furthermore, as shown in FIG. 1C, a dilation technique is applied to the motion signature itself so that small breaks in the motion signature as caused by a small and temporary pause in motion of the operator or of the video feed itself will not result in a broken activity.

Upon determining that an activity has been concluded, the activity is segmented (as indicated by the stationary and solid lines in FIG. 1C) into the activity of interest, and a keyframe is selected.

There are several techniques by which keyframes are selected by keyframe selection manager 123.

In one case, keyframes are selected as the frames bracketing the activity of interest. These frames are either the first and/or last frames of the activity, or those immediately prior and past the time of the activity. The center frame, or a frame chosen as a function of the beginning and end times of the activity of interest can also be chosen.

In yet another case, some measure can be applied to the frames within the activity of interest, and some function of that measure is used to choose the keyframe or keyframes. For instance, in an embodiment, a measure of motion within the area is calculated for each frame during the activity of interest, and the frame with the maximum amount of calculated motion is chosen. See FIG. 1D below for an example of a keyframe chosen according to this measure.

Other measures, as mentioned previously, may also be used. It need not be the case that the measure tracking activity take place on the same scale as the keyframes themselves. And, indeed, that is not the case in provided example. In this example, measuring and tracking the activity takes place at a lower resolution and possibly lower frame rate than the native resolution and frame rate of the video, and the resolution of the keyframes selected. This is for computational efficiency, reliability, and for enabling the different aspects of system 100 to operate on data that is optimal for their specific purposes.

Modeled frame 130B-1 maps to original frame 130A-1, the solid line situated atop the black space represents no recorded or detected activity or motion. Modeled frame 130B-2 maps to original frame 130B-2, the solid line is sweeps downward from frame 130B-1 and is separated by white space on either side before a smaller black space is represented. The sweeping down motion of the solid line is similar to that of an EKG or a seismometer recording activity. The motion signature is captured in the white space separating the bar and the black space. The motion signature is dilated to account for noise, jitter, and minor breaks in motion of both the actors in the scene and the video recording itself. The example activity is finished when keyframe selection manager 123 determines the period of uninterrupted motion has finished as illustrated in modeled frame 130B-5. The broken and thicker line atop the black space of frame 130B-5 illustrates that keyframe selection manager 123 has segmented the activity between the start of the activity represented by the solid line inside the black space and the end of the activity represented by the thicker broken line. Modeled frame 130B-3 maps to frame 130A-3 and modeled frame 130B-4 maps to frame 130A-4.

Figure 1D:
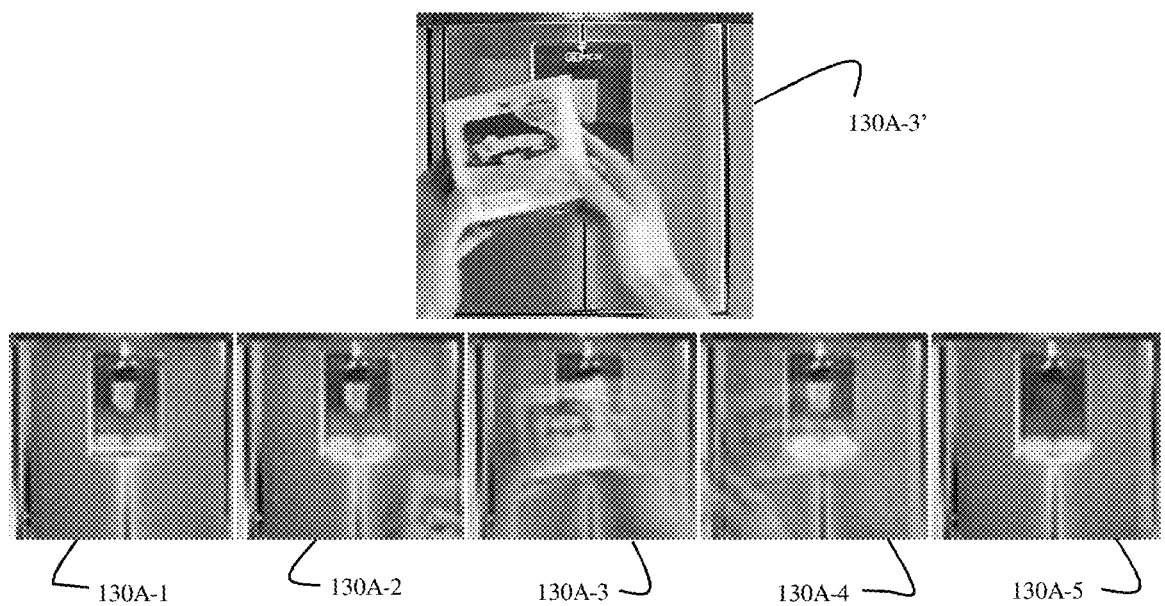
FIG. 1D is a diagram illustrating a selection of a keyframe from the example frames of video from FIG. 1B, according to an example embodiment.

FIG. 1D is a diagram illustrating a selection of a keyframe from the example frames of video from FIG. 1B, according to an example embodiment.

FIG. 1D illustrates a selection of frame 130A-3 by keyframe selection manager 123 as a single keyframe for frames 130A-1 to 130A-5 as keyframe 130A-3', which is illustrated on top of frames 130A-1 to 130A-5. As can be seen from FIG. 1C, it is activity modeled frame 130B-3 which is the frame illustrating the most activity or motion and which also corresponds to frame 130A-3.

Figure 1E:
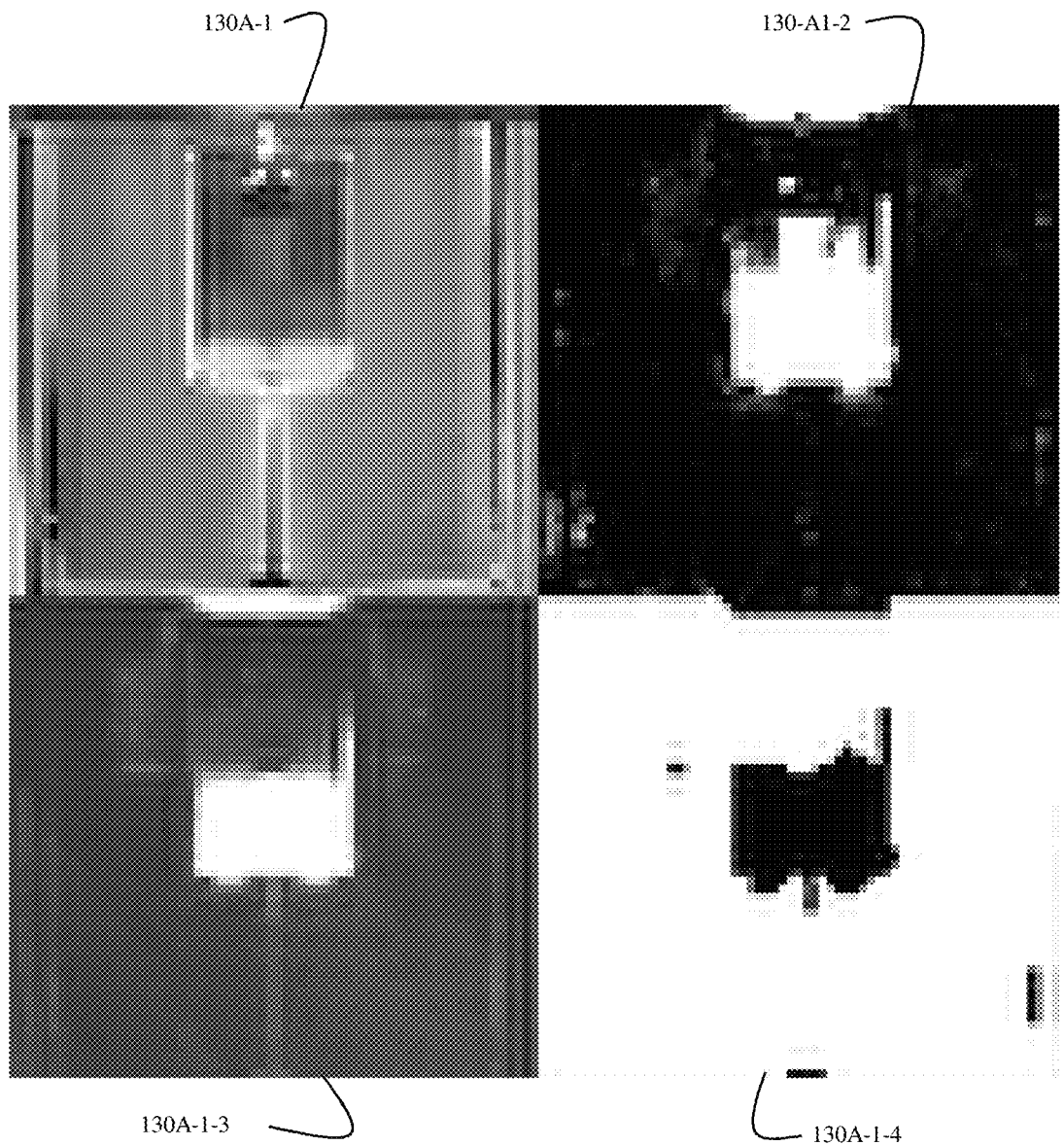
FIG. 1E is a diagram illustrating areas of stability, noise, and motion from the example frames of video from FIG. 1B, according to an example embodiment.

FIG. 1E is a diagram illustrating areas of stability, noise, and motion from the example frames of video from FIG. 1B, according to an example embodiment.

Keyframe selection manager 123 may also calculate from the frames 130A-1 to 130A-5 the areas within the region of interest exhibiting stability (no motion or no activity). Certain areas within the monitored region of interest are perpetually noisy and will make for poor performance in terms of precision in selecting the keyframe or small subset of keyframes using some metrics. The areas are monitored continuously by keyframe selection manager 123 to create a dynamic area of stability within the region of interest. The dynamic area of stability is defined by a mask to consider in metrics used for selecting the keyframe or small subset of keyframes along with those areas to ignore in the metrics used for selecting the keyframe(s). Modeled frame 130A-1-1 illustrates the region or interest or the input image of the region of interest. Modeled frame 130A-1-2 illustrates a current frames measure of motion. Modeled frame 130A-1-3 illustrates noise associated within the region of interest. Modeled frame 130A-1-4 illustrates a stability mask as calculated from the noise model of frame 130A-1-3. It is often the case that the region of interest being monitored of activities of interest from which keyframes are derived is noisy according to the measure of activity being calculated. For example, in the motivating example, motion as calculated via frame differencing is used as the measure of activity. As shown in FIG. 4, this can be a noisy measure in the region interest.

Keyframe selection manager 123 can define areas of stability within the region of interest that are free from noise and thus are good areas to use in the measure of activity. In the provided embodiment, for instance, a measure of noise is calculated according to the signal to noise ratio of individual pixels as taken during low activity times over the course of a 10-minute sliding time window. In this way, a model of the noise at each pixel is maintained. The model is used to continually update a binary mask indicating the areas of stability within the region of interest. It is only within this area that the activity measure (metric) is computed when selecting the keyframe(s), which results in improved precision and accuracy.

Figure 1F:
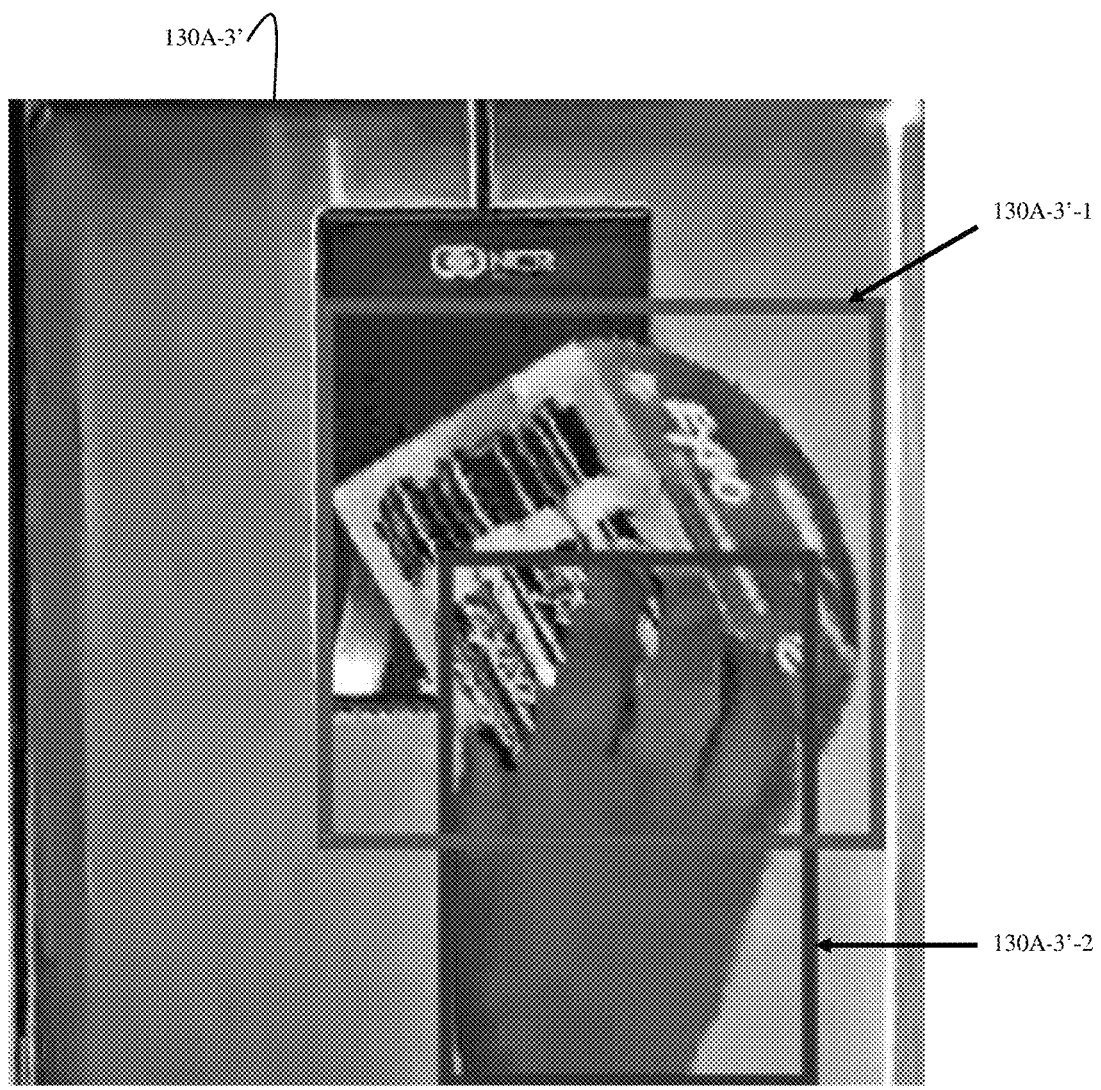
FIG. 1F is a diagram of an analyzed keyframe for object detection and tracking within the keyframe from FIG. 1D, according to an example embodiment.

FIG. 1F is a diagram of an analyzed keyframe for object detection and tracking within the keyframe from FIG. 1D, according to an example embodiment.

As presented in the continuing example presented with FIGS. 1B-1E, an embodiment of system 100 may include consuming applications 124 comprising computer vision and/or machine learning classification applications that determine, for instance, whether the image associated with the selected keyframe 130A-3' shows an item or not, whether the item is a saleable item or a personal item, whether the item was scanned, or whether the item scanned was the correct item. Such keyframe images are also useful for quality assurance purposes by identifying multiple rescan attempts, hard to scan items, and for other purposes.

FIG. 1F shows multiple objects being tracked in the keyframe 130A-3', a first object 130A-3'-1 representing a first superimposed bounding box 130A-3'-1 for an item (markers) and a second object representing a second superimposed bounding box 130A-3'-2 for a hand of an operator of a transaction terminal. Again, the keyframe 130A-3' may be provided as input to a computer vision and/or machine-learning application for processing keyframe 130A-3' and producing the first bounding box 130A-3'-1 and for producing the second bounding box 130A-3'-2.

In another embodiment of system 100, consuming applications 124 may comprise Automated Teller Machine (ATM) facial recognition applications that monitor faces of customers while at an ATM. In such an embodiment, the activity measure/metric is based on facial recognition. The keyframe selection manager 123 is configured to look for and identify faces, and to segment into activities of interest based on face presence. Keyframes are selected from segmented activities of interest based on the quality and confidence measure of the face recognition classification technique.

In still another embodiment of system 100, the consuming application 124 is a You-Only-Look-Once (YOLO) real-time object recognition application for identifying and placing a bounding box around an identified object by YOLO. Once the real-time object recognition application has identified the object to track from the keyframe provided by the keyframe selection manager, a configured amount of the next frames from video 111 (for example the next 10 frames) may then be processed using an optical flow between the next 10 frames. So, the keyframe selection manager 123 identifies a keyframe or small subset of keyframes from an initial portion of frames associated with a video feed. The keyframe is provided as input to the real-time object recognition application, which places a bounding box around the identified object in the keyframe and the next 10 frames of the video feed track the identified object from the bounding box (region of interest) using an optical flow analysis within the next 10 frames. This improves the accuracy and precision of the real-time object recognition application in identifying the object and creating the bounding box for the object within the frames and allows the object's motion or activity to be tracked using optical flow analysis in the next configured amount of frames from the video feed, which is substantially faster (improved processor throughput) and accurate.

In an embodiment of system 100, the consuming applications 124 comprise computer vision applications or machine-learning algorithms associated with monitoring when objects (people or items) are entering or leaving a monitored area. The keyframe selection manager 123 is then processed to select or determine keyframes from frames of the video, and the keyframes are provided as input to the computer vision applications or the machine learning algorithms during the period within which the objects are being in the monitored area for determining activity of the objects within the monitored area for the period and capturing the essence of the activity.

Keyframe selection manager 123 may be triggered and provided a configured number of frames from a video feed based on any configured triggering event. Keyframe selection manager 123 then provides the selected or determined keyframe from the frames and provides the keyframe to a consuming application 124, which improves the accuracy and precision of decisions made by or output produced by the consuming application 124 and improves the processing efficiency of the consuming application 124. Furthermore, optical flow techniques may then be processed to track any given object from a next set of frames of the video feed by the consuming application 124 or other tracking-based applications.

In an embodiment, the keyframe selection techniques of system 100 are used by consuming applications 124 to perform improved item recognition, improved person recognition, improved relationship determinations between a person and an item (e.g., person possess the item, person is de-possessed of the item), improved relationship determinations between items (e.g., a product item is placed in a cart, a product item is placed in a bag, a product item bypassed a scanner, etc.), improved tracking of eyes of a person, improved person behavior determinations (e.g., a person is in distress, a person is laughing, a person is angry, a person is sad, etc.), improved group association determinations (e.g., two or more people are together, two or more people are acting in a common interest, etc.), improved activity or process determinations of a person or a group of persons (e.g., opening procedures at a store, closing procedures at a store, etc.), and/or any other computer vision or machine-learning application that relies on video analysis.

In an embodiment, keyframe selection manager 123 obtains select frames from the video feed based on a triggering event. The triggering event can be raised by a sensor; a transaction terminal based on transaction data; a scanned item barcode, an event raised by a device; a peripheral device, and/or an application; a computer-vision application based on a detected feature in an image or video feed; and/or a determination, prediction, and/or classification produced by a machine learning application. A termination event detected within the select frames based on the activity and motion analysis discussed herein and above permits the keyframe selection manager 123 to obtain a subset of the select frames. The subset of frames representing the video frames from which the keyframe selection manager 123 determines the keyframe or the subset of keyframes by the approaches discussed above.

In an embodiment, keyframe selection manager 123 is executed on a device other than server 120. The device can be a transaction terminal (POS terminal, SST terminal, ATM, or kiosk). The device can be a laptop, a desktop, a phone, a tablet, a wearable processing device, or an Internet-of-Things (IoTs) device.

The above-noted embodiments and other embodiments are now discussed with reference to FIGS. 2-3.

Figure 2:
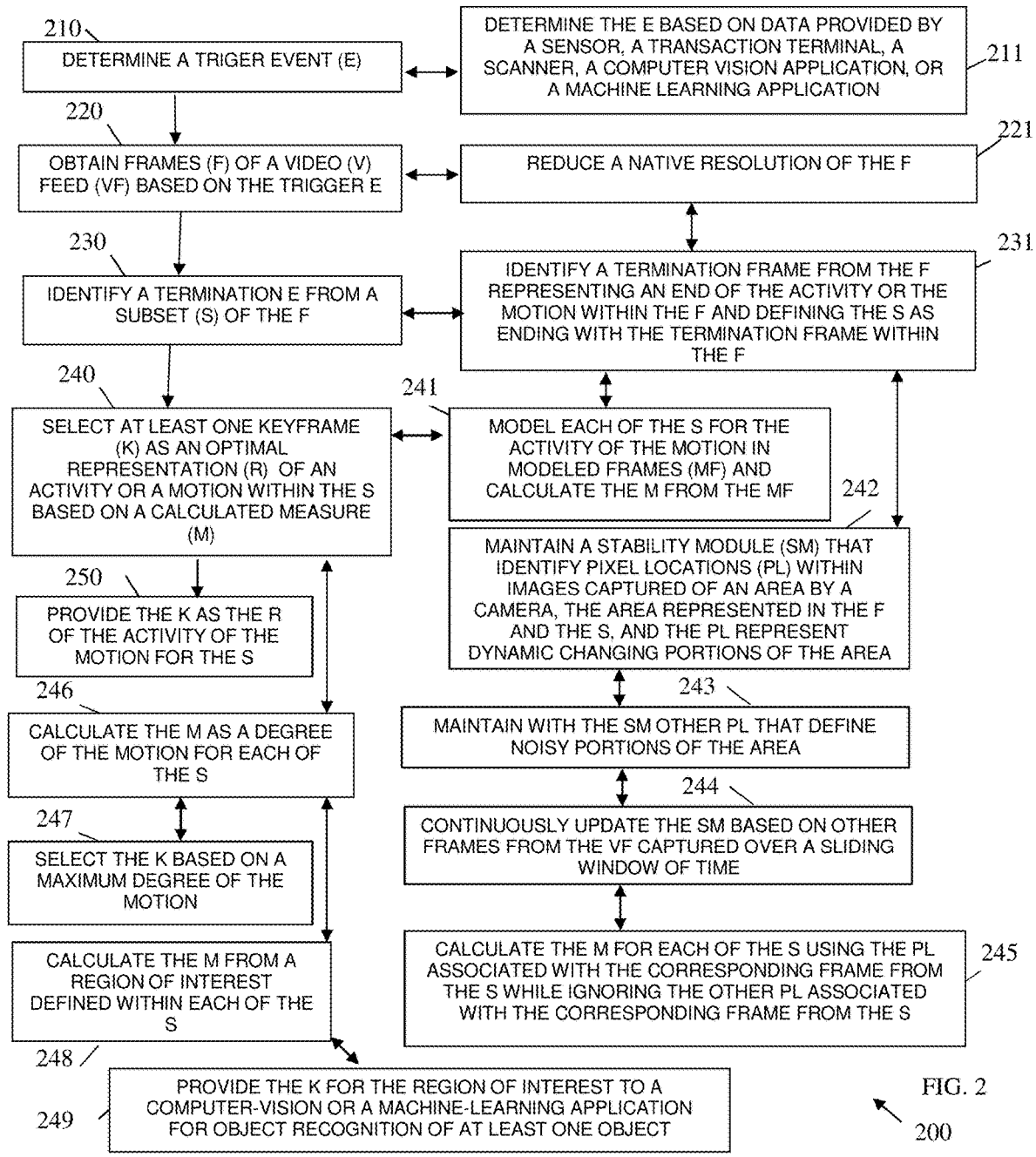
FIG. 2 is a diagram of a method for keyframe detection and determination, according to an example embodiment.

FIG. 2 is a diagram of a method 200 for keyframe selection and determination, according to an example embodiment. The software module(s) that implements the method 200 is referred to as a "keyframe selection manager." The keyframe selection manager is implemented as executable instructions programmed and residing within memory and/or a non-transitory computer-readable (processor-readable) storage medium and executed by one or more processors of a device. The processor(s) of the device that executes the keyframe selection manager are specifically configured and programmed to process the keyframe selection manager. The keyframe selection manager may have access to one or more network connections during its processing. The network connections can be wired, wireless, or a combination of wired and wireless.

In an embodiment, the keyframe selection manager executes on server 120. In an embodiment, the server 120 is one of multiple servers that logically cooperate as a single server representing a cloud processing environment (cloud).

In an embodiment, the device that executes the keyframe selection manager is a transaction terminal (POS terminal, SST terminal, ATM, or kiosk).

In an embodiment, the device that executes the keyframe selection manager is a laptop, a desktop, a phone, a tablet, a wearable processing device, or an IoTs device.

In an embodiment, the keyframe selection manager is keyframe selection manager 123.

At 210, the keyframe selection manager determines a trigger event. The trigger event can be determined based on any of the above-mentioned techniques.

For example, at 211, the keyframe selection manager determines the event based on data provided by a sensor, a transaction terminal, a scanner, a computer vision application, or a machine learning application.

At 220, the keyframe selection manager obtains frames of a video feed based on the trigger event.

In an embodiment of 211 and 220, at 221, the keyframe selection manager reduces a native resolution associated with the frames.

At 230, the keyframe selection manager identifies a termination event or termination condition detected from a subset of the frames.

In an embodiment of 221 and 230, at 231, the keyframe selection manager identifies a termination frame from the frames representing an end of the activity or the motion within the frames and defining the subset of the frames as ending with the termination frame within the frames.

In an embodiment of 210-230, the keyframe selection manager selects the subset of frames based on the trigger event that is computed based on a first computer vision classification. The keyframe selection manager than processes a second computer vision classification to subsequent frames dependent on the first computer vision classification, and the first computer vision classification processes faster than the second computer vision classification.

At 240, the keyframe selection manager selects at least one keyframe as an optimal representation of an activity or a motion within the subset of the frames based on a calculated measure.

In an embodiment of 231 and 240, at 241, the keyframe selection manager models each of the subset of the frames for the activity of the motion in modeled frames and calculating the calculated measure from the first modeled frames.

In an embodiment of 231 and 240, at 242, the keyframe selection manager maintains a stability module that identify pixel locations within images captured of an area by a camera, the area represented in the frames and the subset of frames, and the pixel locations represent dynamic changing portions of the area.

In an embodiment of 242 and at 243, the keyframe selection manager maintains with the stability module other pixel locations that define noisy portions of the area.

In an embodiment of 243 and at 244, the keyframe selection manager continuously updates the stability module based on other frames from the video feed captured over a sliding window of time.

In an embodiment of 244 and at 245, the keyframe selection manager calculates the calculated measure for each of the subset of the frames using the pixel locations associated with the corresponding frame from the subset of the frames while ignoring the other pixel locations associated with the corresponding frame from the subset of the frames.

In an embodiment, at 246, the keyframe selection manager calculates the calculated measure as a degree of the motion for each of the subset of the frames.

In an embodiment of 246 and at 247, the keyframe selection manager selects the at least one keyframe based on a maximum degree of the motion.

In an embodiment, at 248, the keyframe selection manager calculates the calculated measure from a region of interest defined within each of the subset of the frames.

In an embodiment of 248 and at 249, the keyframe selection manager provides the at least one keyframe for the region of interest to a computer-vision or a machine-learning application for object recognition of at least one object represented within the at least one keyframe.

At 250, the keyframe selection manager provides the at least one keyframe as the optimal representation of the activity or the motion for the subset of the frames.

In an embodiment of 250, the keyframe selection manager continuously provides the keyframes from frames being streamed from the video feed to a first computer vision classification application based on a configured trigger event or set of events (iterates back to 210), the first computer vision classification application assigns a first classification to the provided keyframe and subsequent frames from the video feed are then passed to a second computer vision classification application. The second computer vision classification application assigns a second classification to the subsequent frames. The second computer vision classification application processes faster than the first computer vision classification application. In an embodiment, the first computer vision classification application is a YOLO object recognition application and the second computer vision classification application is an optical flow analysis application that tracks movement of the bounding box provided by the Yolo object recognition application in the subsequent frames. In an embodiment the first and second computer vision applications can be any computer vision and/or machine learning applications. In an embodiment, based on a detected quality metric, the tracking/classifications performed by the second computer vision classification application can be cut short, such that and for example, if the subsequent frames were 10 frames, a quality metric at a fifth frame may cause the sixth frame to be passed back to the keyframe selection manager for keyframe determination for purposes of improving the tracking when a quality detected in the subsequent frames is below one or more configured metric thresholds.

Figure 3:
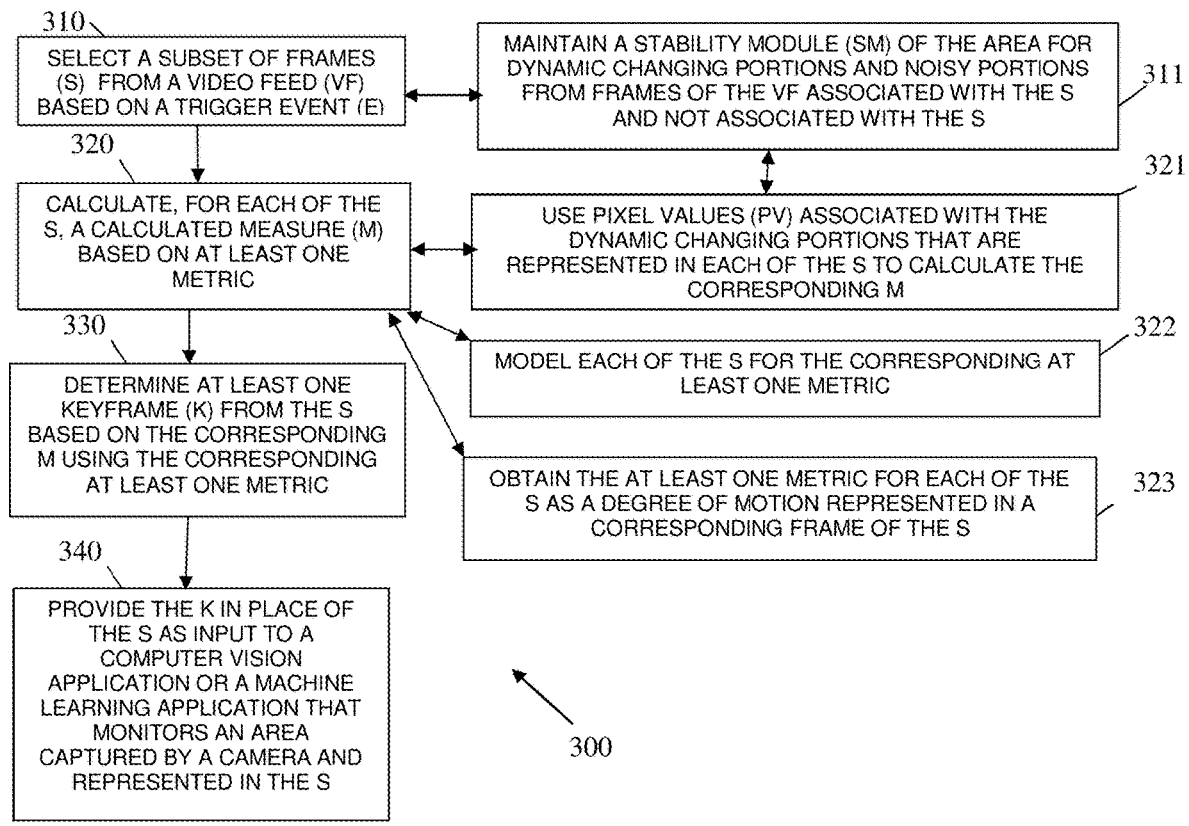
FIG. 3 is a diagram of another method for keyframe detection and determination, according to an example embodiment

FIG. 3 is a diagram of a method 300 for keyframe selection and determination, according to an example embodiment. The software module(s) that implements the method 300 is referred to as a "keyframe determination manager." The keyframe determination manager is implemented as executable instructions programmed and residing within memory and/or a non-transitory computer-readable (processor-readable) storage medium and executed by one or more processors of a device. The processor(s) of the device that executes the keyframe determination manager are specifically configured and programmed to process the keyframe determination manager. The keyframe determination manager may have access to one or more network connections during its processing. The network connections can be wired, wireless, or a combination of wired and wireless.

In an embodiment, the device that executes the keyframe determination manager is server 120. In an embodiment, server 120 is one of multiple servers that cooperate and logically present as a single server associated with a cloud processing environment.

In an embodiment, the device that executes the keyframe determination manager is a transaction terminal (POS terminal, SST, ATM, or kiosk).

In an embodiment, the device that executes the keyframe determination manager is a laptop, a desktop, a phone, a tablet, a wearable processing device, or an IoTs device.

In an embodiment, the keyframe determination manager is all of, or some combination of, keyframe selection manager 123 and/or method 200.

The keyframe determination manager represents another and, in some ways, an enhanced processing perspective of what was discussed above for the method 200.

At 310, the keyframe determination manager selects a subset of frames from a video feed based on a trigger event.

In an embodiment, at 311, the keyframe determination manager a stability module of the area for dynamic changing portions and noisy portions from frames of the video feed associated with the subset of frames and not associated with the subset of frames.

At 320, the keyframe determination manager calculates, for each of the subset of frames, a calculated measure based on the at least one metric.

In an embodiment of 311 and 320, at 321, the keyframe determination manager uses pixel values associated with the dynamic changing portions that are represented in each of the subset of frames to calculate the corresponding calculated measure.

In an embodiment, at 322, the keyframe determination manager models each of the subset of frames for the corresponding at least one metric.

In an embodiment, at 323, the keyframe determination manager obtains the at least one metric for each of the subset of frames as a degree of motion represented in a corresponding frame of the subset of frames.

At 330, the keyframe determination manager determines at least one keyframe from the subset of frames based on the corresponding calculated measure using the corresponding at least one metric.

At 340, the keyframe determination manager provides the at least one keyframe in place of the subset of frames as input to a computer vision application or a machine learning application that monitors an area captured by a camera and represented in the subset of frames.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    determining a trigger event;
    obtaining frames of a video feed based on the trigger event, wherein the video feed is captured for a transaction area associated with a transaction;
    identifying a termination event from a subset of the frames;
    selecting at least one keyframe from the subset of frames as an optimal representation of an activity or a motion within the subset of the frames based on a calculated measure, wherein the activity or motion associated with an item for the transaction;

recasting the at least one keyframe into at least one modeled keyframe for the activity or the motion, wherein recasting further includes:

applying a motion blur to an activity tracker to smooth out a signal associated with the activity or the motion modeled in the at least one modeled keyframe; and tracking a magnitude of the activity or the motion detected across the at least one keyframe; and providing the at least one modeled keyframe as the optimal representation of the activity or the motion for the at least one keyframe selected from the subset of the frames, wherein providing further includes:

providing the at least one modeled one keyframe in place of at least one keyframe and the subset of frames as input to a machine learning application that monitors the transaction area to determine whether the item was scanned for the transaction, was a correct item for the transaction, was a saleable item, or was a personal item.

2. The method of claim 1, wherein determining further includes determining the event based on data provided by a sensor, a transaction terminal, a scanner, or a computer vision application.

3. The method of claim 1, wherein obtaining further includes reducing a native resolution of the frames.

4. The method of claim 3, wherein identifying further includes identifying a termination frame from the frames representing an end of the activity or the motion within the frames and defining the subset of the frames as ending with the termination frame within the frames.

5. The method of claim 4, wherein selecting further includes modeling each of the subset of the frames or the activity of the motion in modeled frames and calculating the calculated measure from first modeled frames.

6. The method of claim 4, wherein modeling further includes maintaining a stability model that identify pixel locations within images captured of the area by a camera, the area represented in the frames and the subset of frames, and the pixel locations represent dynamic changing portions of the area.

7. The method of claim 6, wherein maintaining further includes maintaining with the stability model other pixel locations that define noisy portions of the transaction area.

8. The method of claim 7, wherein maintaining further includes continuously updating the stability model based on other frames from the video feed captured over a sliding window of time.

9. The method of claim 8, wherein maintaining further includes calculating the calculated measure for each of the subset of the frames using the pixel locations associated with a corresponding frame from the subset of the frames while ignoring the other pixel locations associated with the corresponding frame from the subset of the frames.

10. The method of claim 1, wherein selecting further includes calculating the calculated measure as a degree of the motion for each of the subset of the frames.

11. The method of claim 10, wherein calculating further includes selecting the at least one keyframe based on a maximum degree of the motion.

12. The method of claim 1, wherein selecting further includes calculating the calculated measure from a region of interest defined within each of the subset of the frames.

13. The method of claim 1 further comprising:

selecting a second subset of the frames based on a second trigger event, wherein the second trigger event is computed based on a first computer vision classification;

applying a second computer vision classification to subsequent frames dependent on the first computer vision classification of the second subset of the frames, wherein the second computer vision classification is processed faster than the first computer vision classification.

14. A method, comprising:

selecting a subset of frames from a video feed based on a trigger event, wherein the video feed captured by a camera of a transaction area for a transaction;

calculating, for each of the subset of frames, a calculated measure based on at least one metric;

determining at least one keyframe from the subset of frames based on a corresponding calculated measure using the corresponding at least one metric;

recasting the at least one keyframe into at least one modeled keyframe, wherein recasting further includes:

applying a motion blur to an activity tracker to smooth out a signal associated with a motion modeled in the at least one modeled keyframe; and tracking a magnitude of the motion detected across the at least one keyframe; and providing the at least one modeled keyframe in place of the at least one keyframe and the subset of frames as input to a machine learning application that monitors the area to determine whether an item was scanned for the transaction, was a correct item for the transaction, was a saleable item, or was a personal item.

15. The method of claim 14, wherein selecting further includes maintaining a stability model of the area for dynamic changing portions and noisy portions from frames of the video feed associated with the subset of frames and not associated with the subset of frames.

16. The method of claim 15, wherein calculating further includes using pixel values associated with the dynamic changing portions that are represented in each of the subset of frames to calculate the corresponding calculated measure.

17. The method of claim 14, wherein calculating further includes modeling each of the subset of frames for the corresponding at least one metric.

18. The method of claim 14, wherein calculating further includes obtaining the at least one metric for each of the subset of frames as a degree of the motion represented in a corresponding frame of the subset of frames.

19. A system, comprising:

a camera;

a device comprising a processor and a non-transitory computer-readable storage medium comprising executable instructions; and the executable instructions when executed by the processor from the non-transitory computer-readable storage medium causing the processor to perform processing comprising:

obtaining a subset of frames from a video feed captured by the camera for a transaction area based on at least one trigger event for a transaction being performed within the transaction area;

deriving at least one motion metric for each of the subset of frames;

calculating a measure for each of the subset of frames based on a corresponding at least one motion metric;

selecting at least one keyframe from the subset of frames based on the corresponding measure associated with each of the subset of frames;

recasting the at least one keyframe into at least one modeled keyframe, wherein recasting further includes:

applying a motion blur to an activity tracker to smooth out a signal associated with a motion being modeled in the at least one modeled keyframe; and tracking a magnitude of the motion detected across the at least one keyframe; and providing the at least one modeled keyframe as an optimal frame determined from the at least one keyframe selected from the subset of frames, wherein providing further includes:

providing the at least one modeled keyframe in place of the at least one keyframe and the subset of frames as input to a machine learning application that monitors the transaction area to determine whether an item was scanned for the transaction, was a correct item for the transaction, was a saleable item, or was a personal item.

20. The system of claim 19, wherein the executable instructions when executed by the processor from the non-transitory computer-readable storage medium further causing the processor to perform additional processing comprising:

providing the at least one keyframe as input to a computer-vision application or the machine-learning application for object recognition or object tracking of at least one object represented in the subset of frames.

* * * * *